United States Patent [19]

Edwards

[11] Patent Number: 4,934,219
[45] Date of Patent: Jun. 19, 1990

[54] COAXIAL CABLE STRIPPER TOOL AND METHOD

[76] Inventor: Daniel B. Edwards, P.O. Box 19022, Asheville, N.C. 28815

[21] Appl. No.: 267,176

[22] Filed: Nov. 4, 1988

[51] Int. Cl.⁵ .............................................. G02G 1/12
[52] U.S. Cl. ..................................... 81/9.44; 30/90.1
[58] Field of Search .................... 81/9.4, 9.44; 30/90.1

[56] References Cited

U.S. PATENT DOCUMENTS

| | | | |
|---|---|---|---|
| 4,366,619 | 1/1983 | Bieganski | 30/90.1 |
| 4,640,009 | 2/1987 | Liversidge | 30/90.1 |
| 4,805,302 | 2/1989 | Steiner | 30/90.1 |
| 4,835,862 | 6/1989 | Phillips | 30/90.1 |

*Primary Examiner*—Roscoe V. Parker
*Attorney, Agent, or Firm*—David M. Carter

[57] ABSTRACT

There is provided an improved apparatus and method for stripping insulation from coaxial cable for placing the cable in condition to be terminated to a connector. The apparatus is in the form of a hand tool which includes a single spring biased blade and a plurality of bore holes of different diameters adjacent to the blade. The coaxial cable is inserted in a first bore hole where the outer insulation is stripped by the blade. The cable braid is then partially flared out and the cable is placed in a second bore hole having an annular shoulder, which causes the braid to be peeled back thereby exposing the inner insulation which is then stripped by the blade. The blade does not come in contact with the braid, thereby alleviating problems of shorting the braid to the conductor, scoring the conductor, and damaging the blade.

13 Claims, 3 Drawing Sheets

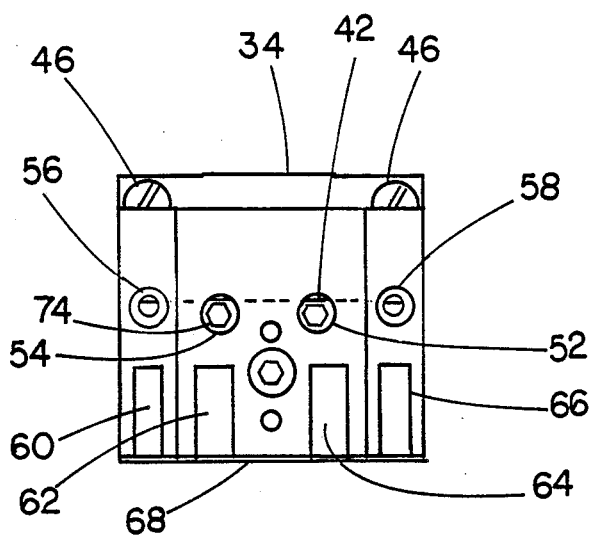
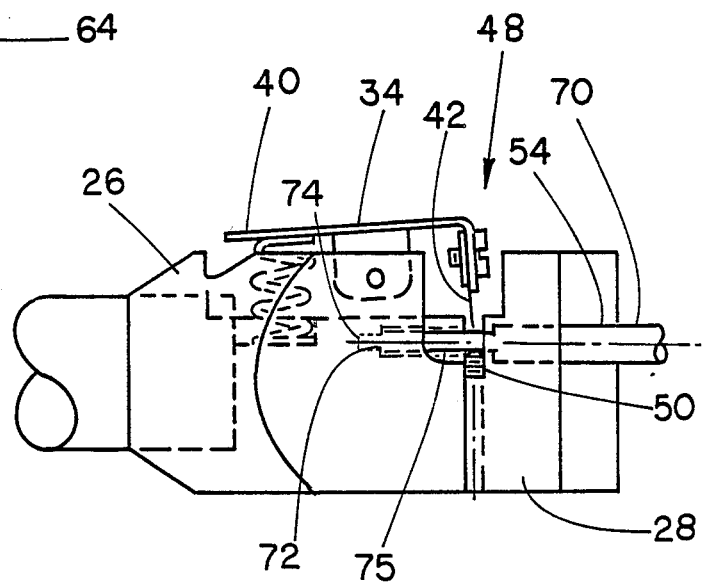
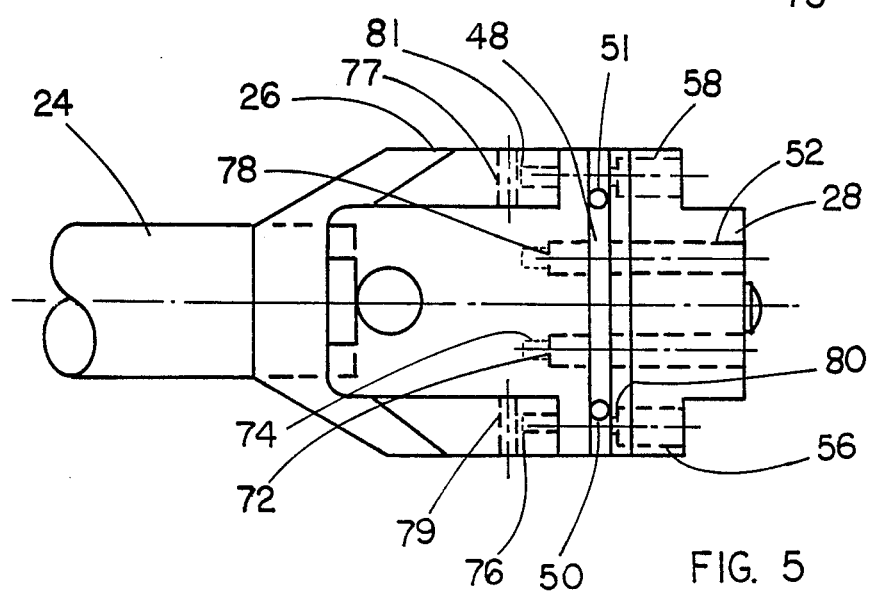

COAXIAL CABLE STRIPPER TOOL AND METHOD

BACKGROUND OF THE INVENTION

This invention relates to cable insulation stripping tools. More particularly, it relates to insulation stripping tools for coaxial cable.

With the phenomenal growth of cable television, the use of coaxial cable has also grown accordingly. As shown in FIG. 1, coaxial cable 10 generally is constructed with a single inner copper conductor 12 having an inner insulation 14, normally of a formed plastic material such as polypropylene foam surrounding the conductor, and a very thin aluminum ground shield 15 surrounding the inner insulation. A tough metal braid 16 surrounds the shield in order to protect the shield and to provide further shielding for the inner conductor. The braid is normally made of a large number of thin wires twisted together along the length of the cable. The cable further includes an outer insulation or jacket 18 which is normally made of polyethylene.

As with all electrical cables, in order to terminate the end of the cable to an electrical connector, the end of the cable must be stripped down to the inner conductor. With ordinary cable, which is normally an electrical conductor surrounded by insulation, stripping the insulation from the conductor does not present much of a problem. However due to the complex structure of coaxial cable, difficulties have been encountered.

One of the major problems occurs because the stripper blade is often used to cut through the braid while also stripping the insulation. The blade becomes dull because of the tough metal braid, thereby necessitating replacement of the blade. This stripping technique has been found to cause the braid to come into contact with the conductor, resulting in short circuits and scoring of the conductor.

One of the leading coaxial cable stripping device products on the market today is called The Coaxial Cable Peeler. The Coaxial Cable Peeler utilizes two blades which are offset from one another. The first blade is used to cut through the outer insulation, the braid and the shield, and the second blade is used to cut through the outer insulation only. The Cable Peeler has the drawbacks set forth above.

The following U.S. Patents show cable strippers which utilize a single specially made blade: U.S. Pat. Nos. 4,594,029 issued to Michael; 4,379,665 issued to Hendershot; 4,729,268 issued to Morrow; 4,426,778 issued to Christie; 4,317,279 issued to Smith; 4,203,333 issued to Campari; 4,112,791 issued to Wiener; and 4,116,092 issued to Wheeler. U.S. Pat. No. 4,366,619 issued to Brieganski shows a cable stripper which utilizes three separate blades for stripping the outer insulation, the braid, and the inner insulation. Each blade is separately adjusted. Brieganski also uses specially made blades.

OBJECTS OF THE INVENTION

It is therefore one object of this invention to provide an improved cable stripper.

It is another object to provide an improved coaxial cable stripper which is inexpensive to manufacture and easy to use.

It is another object to provide a coaxial cable stripper which uses an off-the-shelf blade and which does not require frequent changes of the blade.

It is another object of the invention to provide a coaxial cable stripper which avoids short circuits between the braid and the conductor and further avoids scoring the conductor.

SUMMARY OF THE INVENTION

In accordance with one form of this invention, there is provided a cable stripper tool for removing portions of inner and outer insulation from the cable. The tool includes a body and a plurality of bore holes in the body. A first bore hole receives unstripped cable and a second bore hole receives partially stripped cable. A movable blade is mounted to the body. A recess in the body communicates with a portion of each of said bore holes. The sharp end of the blade moves in and out of the recess. A first stop is associated with the first bore hole and a second stop is associated with the second bore hole. The first stop contacts the cable so that a predetermined length of outer insulation may be stripped. A second stop contacts the cable so that a predetermined length of inner insulation may be stripped.

In accordance with another form of this invention a method of stripping coaxial cable having outer insulation, a braid, and an inner insulation is provided. The method includes inserting the end of the cable into a first bore hole of the tool until the cable reaches a first stop; cutting substantially the entire thickness of the outer insulation; removing the cable from the first bore hole; removing the outer insulation from the cut end of the cable; inserting the cable into a second bore hole in the tool until a portion of the cable reaches a second stop; bending back the ends of the braid; cutting substantially the entire thickness of the inner insulation; removing the cable from the second bore hole; removing the inner insulation from the cut end of the cable. Preferably the braid is somewhat flared out prior to the insertion of the cable into the second bore hole so that the second stop will more readily cause the braid to bend back.

Utilizing the above described apparatus and method, a coaxial cable may be easily stripped without the necessity of cutting through the braid which causes blades to be dulled and further causes short circuits and nicks in the conductor which results from the braid coming into contact with the conductor when the braid is severed. Furthermore, in the preferred embodiment a single inexpensive off-the-shelf blade is utilized. Preferably the bore hole used when stripping the outer conductor is offset from the bore hole used when stripping the inner conductor, thus the depth of the cut into the cable insulation may be determined by the offset as well as by other adjustments.

BRIEF DESCRIPTION OF THE DRAWINGS

The subject matter which is regarded as the invention is set forth in the appended claims. The invention itself, however, together with further objects and advantages thereof, may be better understood by reference to the accompanying description taken in conjunction with the accompanying drawings in which:

FIG. 3 is a front elevational view of the apparatus of FIG. 2.

FIG. 4 is a side elevational view of the apparatus of FIG. 2.

FIG. 5 is a top view of the apparatus of FIG. 2 with portions removed showing the bore holes in phantom.

DESCRIPTION OF THE PREFERRED EMBODIMENT

Figure 1:
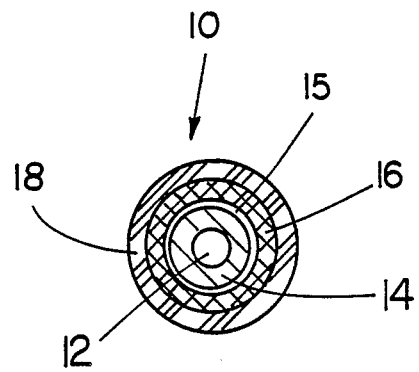
FIG. 1 is a sectional view of a standard coaxial cable.
Figure 2:
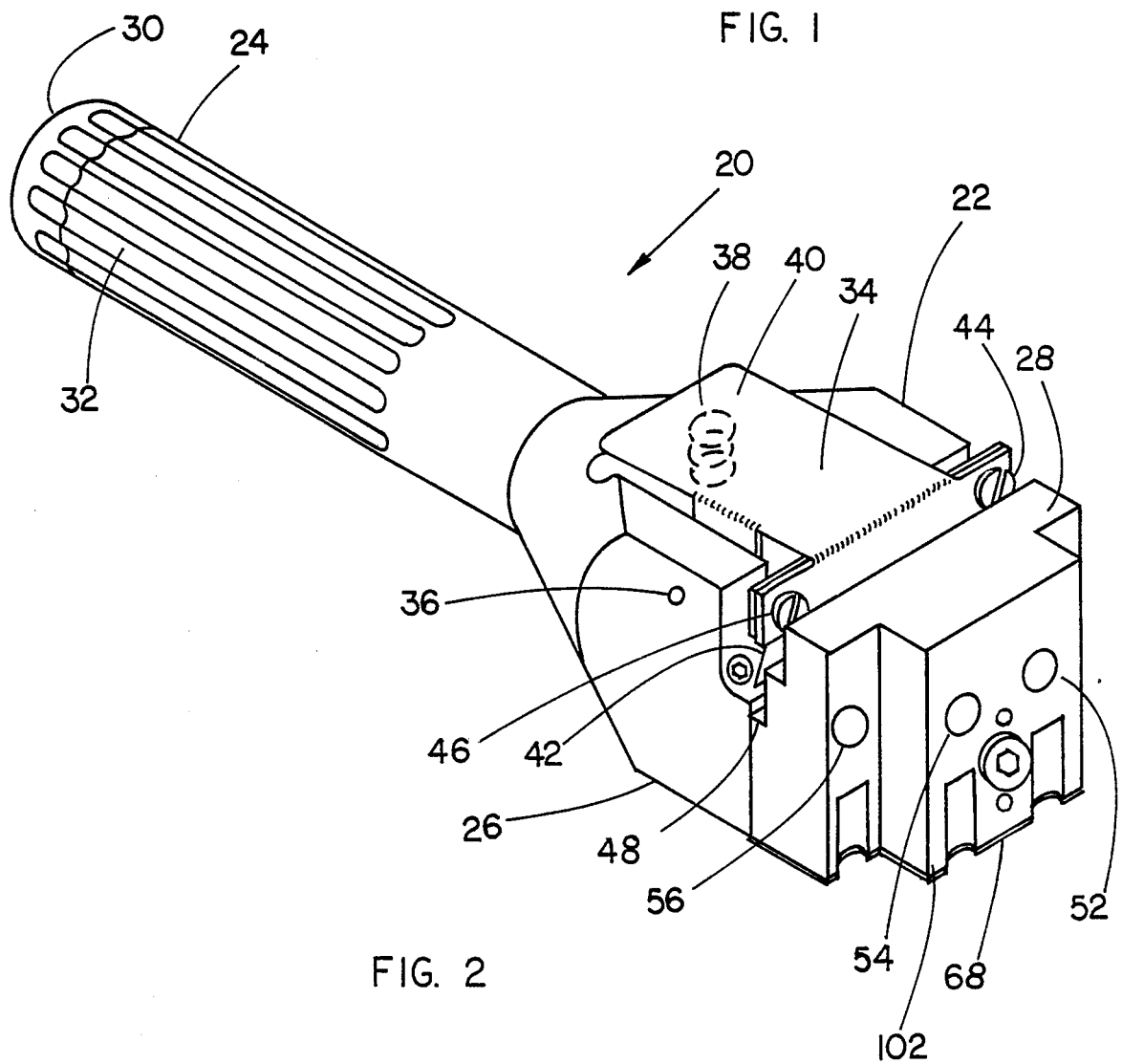
FIG. 2 is a pictorial view of the apparatus of the subject invention.

Referring now more particularly to FIG. 2, there is provided coaxial stripper tool 20 including body 22 which may be made of molded plastic. Body 22 includes handle portion 24, mid portion 26 and front portion 28. The handle 24 is preferably hollow and thus may contain additional blades, fittings, and a small screwdriver or other tools for making adjustments to the tool. Screw cap 30 closes the end of handle 24. Handle 24 also includes gripping grooves 32 making the tool easier to rotate.

Tool 20 further includes blade holder 34 which is mounted to the mid portion 26 of the body 22 by means of screw 36 and an additional screw on the other side of the body which is not shown. Spring 38 is connected to the thumb lever portion 40 of blade holder 34 and biases the blade 42 in the down position. Blade 42 is connected to blade mount 34 by means of screws 44 and 46. Blade 42 is received in channel 48 formed in the body 22. As shown in FIG. 4, the bottom of blade 42 comes to rest against the top of screw 50 which provides a stop for the blade and also adjusts the heights of the blade. Again referring to FIG. 2, the front portion 28 of the body 22 includes a plurality of bore holes 52, 54, and 56, as well as a fourth bore hole 58 which is shown in FIG. 3. Bore holes 52 and 54 are of different diameters to accommodate different diameters of coaxial cable and are used when stripping the outer insulation from the cable. Bore holes 56 and 58 are used when stripping the inner insulation from the coaxial cable. As can be seen, bore holes 54 and 56 are offset from one another with the center of bore hole 56 being higher than the center of bore hole 54. The offset is done so that a single blade 42 may be used to strip both the inner insulation and the outer insulation without a requirement to adjust the depth of the blade; that is, by having center of bore hole 56 higher than the center of bore hole 54, the blade will go deeper into the cable in bore hole 56 to substantially reach the full thickness of the inner insulation. Since the outer insulation is not as deep in the cable, bore hole 54 is lower and substantially the full thickness of the outer insulation may be cut. Bore holes 52 and 58 are also offset for the same reason.

Recesses 60, 62, 64 and 66 are received on the front portion 28 of the body as shown in FIG. 3. Below the recesses is a metal plate 68. These recesses are used in combination with the plate in order to pull off the insulation in case that the insulation does not fall after it is cut in the channel 48 of the tool.

Figure 7:
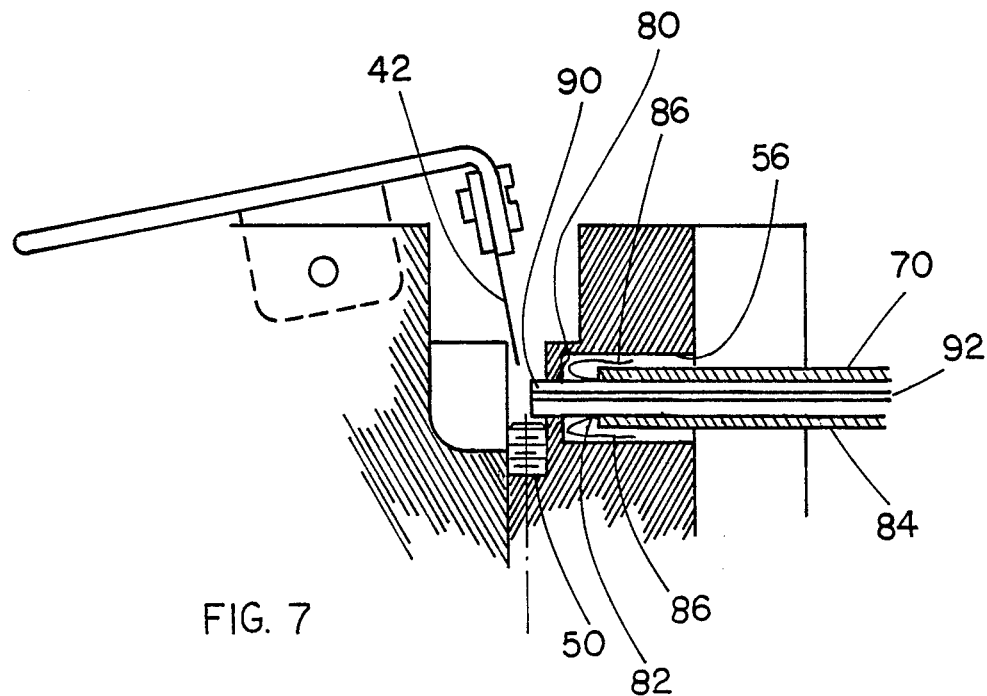
FIG. 7 is a partial sectional view of a portion of the apparatus of FIG. 2.

Referring now more particularly to FIG. 4, blade 42 is shown in its down or cutting position. To move the blade to its up position as shown in FIG. 7, the operator applies pressure with his thumb on pressure plate 40 thereby rotating the blade holder 34 causing the blade 42 to elevate. Again referring to FIG. 4, coaxial cable 70 has been inserted in bore hole 54 which runs through the front portion 28 and ends at stop member 72 which may include screw 74 shown in FIG. 3 which makes the length of the bore hole adjustable. The end portion 75 of cable 70 which is shown in groove 48 constitutes the portion of the cable which is to be stripped of its outer insulation. This is accomplished by permitting blade 42 to come down onto the outer insulation by removing one's thumb from pressure plate 40 and by simply rotating the tool 360° while one holds onto cable 70 to keep the cable from also rotating. The rotation results in the scoring or cutting of the outer insulation of the cable. Screw 50 acts as a stop for depth of the blade and may be adjusted so that the blade will only cut the outer insulation and will not cut into the braid of the cable.

Referring now to FIG. 5 which shows the middle and end of body portions 26 and 28 and a portion of handle 24, the blade and the blade holder and its spring have been removed for clarity. Bore holes 52, 54, 56 and 58 extend through front portion 28 and into a part of the middle portion 26 of the body but are broken by blade receiving groove 48. Each bore hole includes a respective end or stop 72, 76, 78 and 81 which determine the length of the insulation which is stripped from the cable. Bore holes 77 and 79 receive screws 36 which in turn are attached to blade holder 34 for holding the blade holder onto the body and for permitting the blade holder to rotate.

Now referring to FIG. 7, annular shoulder 80 forms a stop in bore hole 56 and abuts against the severed end 82 of outer insulation 84 of the cable. Shoulder 80 will also function to assist in peeling back braid 86 as the cable 70 is pressed into bore hole 56 through to stop 76 with the blade 42 in the up position. Screw 50 which is not in alignment with cable 70 or bore hole 56 provides a stop for blade 42 to the extent of the depth of inner insulation 90 so that the conductor 92 is not scored.

The apparatus described herein may be used as follows. Coaxial cable 70 is first inserted either into bore hole 52 or 54, depending on its diameter. Blade 42 is raised by pressing the thumb portion of blade holder 42 to permit the cable 70 to pass through groove 48 to stop 72. Blade 42 is then lowered by releasing thumb portion 40 and the blade will penetrate only the depth of outer insulation 84 of the coaxial cable and will not come into contact with braid 86 because of screw 50 which acts as a stop for the blade. Apparatus 20 is then rotated 360° while one holds onto cable 70 so that the cable does not rotate thereby causing cut 94. The cable is then withdrawn from bore hole 54 such that end portion 96 of the outer insulation of the cable is removed Alternatively, the blade may be raised and the entire cable withdrawn from the bore hole 54 and the end of the cable is then placed into groove 62 and pulled downwardly against metal plate 68 thereby pulling the end 96 of the outer insulation free.

Figure 6A:
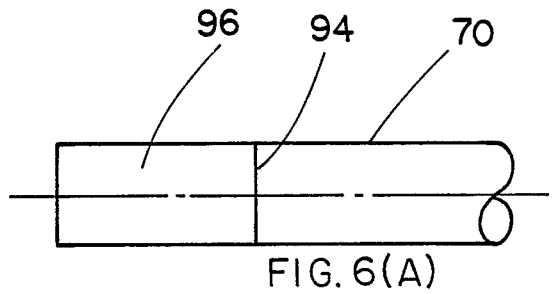
FIG. 6(A), FIG. 6(B) and FIG. 6(C) are partial views of a coaxial cable in the various stages of being stripped in accordance with the methods of this invention.
Figure 6B:
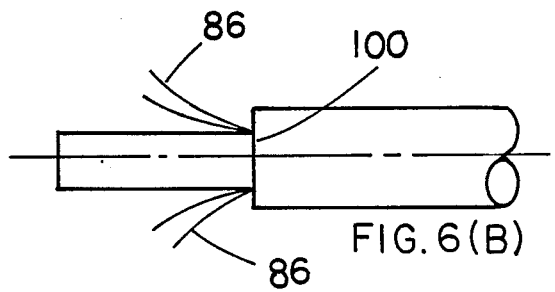
Figure 6C:
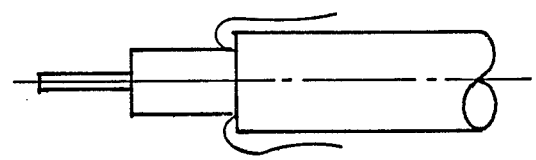

The braid 86 shown in FIG. 6(c) may then be folded back by the use of the tool or the user may simply fold back the braid completely onto the cable. However, preferably the braid is first only partially flared back by hand as shown in FIG. 6(b). The cable is then inserted into either bore hole 56 or bore hole 58 depending on the diameter of the cable. As shown in FIG. 7, when the inner conductor 70 and the inner insulation 90 pass through the hole created by annular shoulder 80, the braid 86 will begin to peel back so that it lays on the outer insulation of the cable when shoulder 82 of the outer insulation comes against annular abutment 80.

The end of the cable then may also come against stop 76 with the blade 42 in the elevated position. Blade 42 is then permitted to drop down upon the outer insulation 90 of the cable but only to the extent of the depth of the outer insulation so that the conductor 92 is not scarred by the blade. Again the depth is determined by screw 50 and since bore holes 54 and 56 are offset from one another, a single blade may be used for both cuts and normally there is no need to make an adjustment of screw 50.

Tool 22 is again rotated 360° causing cut 100 to occur around the inner insulation. The cable is then withdrawn either with the blade in the down or up position. If the blade is in the down position the inner insulation should come off in gap 48, however if the cable is withdrawn with the blade in the up position, the cable is then placed in groove 62 shown in FIG. 3 and pulled downwardly so that the plate 68 which extends slightly beyond the face 102 of the end plate 28 will pull the stripped inner insulation away from the conductor. Both the outer and inner insulation are thus stripped using a single blade and without cutting the braid with the blade.

In referring to the stripping of the inner insulation the thin metal shield is also stripped at the same time as the inner insulation. This thin aluminum shield is so thin that it should not cause a problem of dulling the blade 42. Also there may be a hole placed below groove 48 which is not shown to permit the stripped portions of the insulation to simply fall out of the tool.

From the foregoing description of the preferred embodiment of the invention, it is apparent that many modifications may be made therein without departing from the true spirit and scope of the invention.

I claim:

1. A coaxial cable stripper tool which removes the outer and inner insulation of coaxial cable without cutting the braid of the cable comprising:
    a body;
    a plurality of bore holes in said body including a first bore hole for receiving unstriped cable and a second bore hole for receiving cable having a portion of its outer insulation stripped; said tool including a blade;
    a recess in said body communicating with a portion of each of said bore holes; a portion of said blade received in said recess;
    means to determine the length of the outer insulation of the cable to be stripped associated with said first bore hole; an annular shoulder received inside of said second bore hole; said annular shoulder acting as a stop for abutting against one end of said outer insulation wherein a predetermined length of inner insulation may be stripped without cutting the braid.

2. A tool as set forth in claim 1 wherein said blade is controlled by at least one spring so that said blade may be moved in and out of contact with the cable.

3. A tool as set forth in claim 2 wherein said blade is biased in the down position.

4. A tool as set forth in claim 3 further including means for moving said blade to an upward position.

5. A tool as set forth in claim 1 further including a handle connected to said body for enabling one to grip and rotate said tool.

6. A tool as set forth in claim 1 further including third and fourth bore holes in said body respectively constructed substantially similarly to said first and second bore holes; said third bore hole being a larger diameter than said first bore hole and said fourth bore hole being a larger diameter than second bore hole whereby said tool will accommodate more than one cable size.

7. A tool as set forth in claim 1 wherein said blade is a single blade.

8. A tool as set forth in claim 1 further including means for adjusting the height of said blade in said recess whereby the depth of cuts may be adjusted.

9. A tool as set forth in claim 8 wherein said means for adjusting includes at least one screw forming a stop for said blade.

10. A tool as set forth in claim 1 further including means for removing said outer and inner insulation after said insulation has been severed.

11. A tool as set forth in claim 1 wherein said first and second bore holes are offset from one another whereby the depths of cuts for said outer insulation and said inner insulation may be maintained without the necessity of adjusting the height of said blade and for enabling the use of a single blade for cutting both the outer and inner insulation.

12. A method for stripping coaxial cable having outer insulation, a braid, and inner insulation, comprising the steps of:
    inserting the end of said cable into a first bore hole of a tool;
    measuring a portion of the cable;
    cutting the outer insulation of the measured portion of the cable;
    removing the cable from the first bore hole;
    removing the cut portion of the outer insulation;
    flaring out the exposed portion of the braid;
    inserting the cable into a second bore hole in the tool until a portion of the cable reaches an annular shoulder inside of said second bore hole;
    bending the exposed portion of the braid back adjacent a portion of the remaining outer insulation;
    cutting the inner insulation;
    removing the cable from the second bore hole;
    removing the cut portion of the inner insulation.

13. A method as set forth in claim 12 further including the steps of raising the blade prior to the insertion of the cable in said first and second bore holes;
    lowering the blade after insertion of the cable in said first and second bore holes;
    rotating the tool after each lowering of the blade.

* * * * *